United States Patent
Sandahl et al.

(10) Patent No.: US 12,463,236 B2
(45) Date of Patent: Nov. 4, 2025

(54) ELECTROCHEMICAL DEVICE HAVING SPIRAL WOUND ELECTRODES

(71) Applicant: Rolled-Ribbon Battery Company LLC, Austin, TX (US)

(72) Inventors: Joel Ernest Sandahl, Dripping Springs, TX (US); William Joel Starling, Austin, TX (US); David Aaron Kaplin, Kyle, TX (US); Erik Lee, Cedar Park, TX (US)

(73) Assignee: Rolled-Ribbon Battery Company LLC, Austin, TX (US)

( * ) Notice: Subject to any disclaimer, the term of this patent is extended or adjusted under 35 U.S.C. 154(b) by 462 days.

(21) Appl. No.: 17/317,431

(22) Filed: May 11, 2021

(65) Prior Publication Data
US 2022/0367900 A1  Nov. 17, 2022

(51) Int. Cl.
*H01M 10/04* (2006.01)
*H01M 50/184* (2021.01)

(52) U.S. Cl.
CPC ... *H01M 10/0431* (2013.01); *H01M 10/0413* (2013.01); *H01M 50/184* (2021.01)

(58) Field of Classification Search
CPC ......... H01M 10/0431; H01M 10/0413; H01M 10/0583; H01M 10/0525; H01M 10/04; H01M 10/045; H01M 10/0587
See application file for complete search history.

(56) References Cited

U.S. PATENT DOCUMENTS

| | | |
|---|---|---|
| 5,219,673 A | 6/1993 | Kaun |
| 7,195,840 B2 | 3/2007 | Kaun |
| 8,021,775 B2 | 9/2011 | Kaun |
| 8,263,248 B2 | 9/2012 | Kaun |
| 8,734,983 B2 | 5/2014 | Kaun |

(Continued)

FOREIGN PATENT DOCUMENTS

| | | | |
|---|---|---|---|
| JP | 2007294111 A | * | 11/2007 |
| KR | 100490526 B1 | * | 5/2000 |

OTHER PUBLICATIONS

Espacenet machine translation of Jeong (KR 100490526 B1). (Year: 2000).*

(Continued)

*Primary Examiner* — Haroon S. Sheikh
(74) *Attorney, Agent, or Firm* — Kenneth J. LuKacher Law Group; Kenneth J. LuKacher

(57) ABSTRACT

An electrochemical device having a roll with elongated electrodes each supported in one of two alternating folds of a separator layer, and spirally wound in the roll with the separator layer to define two opposing ends, each of such ends only exposing a different one of the electrodes wound along the roll. The device having a disc shaped housing having upper and lower portions fixable to each other to set the device height. The upper portion provides a first member with a first surface disposed along one end of the roll. A second member with a second surface is disposed along the other end of the roll. Spring elements compressed between the second member and a third member, provided by the housing lower portion, apply pressure to force the second member toward the first member promoting contact of the first and second surfaces with different ones of the exposed electrodes.

34 Claims, 12 Drawing Sheets

(56) References Cited

U.S. PATENT DOCUMENTS

| | | |
|---|---|---|
| 10,804,506 B2 | 10/2020 | Gaugler |
| 10,971,776 B2 | 4/2021 | Gaugler |
| 2003/0104274 A1 | 6/2003 | Wiepen |
| 2012/0034500 A1 | 2/2012 | Kaun |
| 2013/0216909 A1* | 8/2013 | Sato .................. H01M 4/604 |
| | | 429/213 |
| 2019/0280325 A1 | 9/2019 | Jung et al. |
| 2020/0144676 A1 | 5/2020 | Tsuruta et al. |
| 2020/0251767 A1 | 8/2020 | Harrison et al. |
| 2023/0344053 A1* | 10/2023 | Taga .................. H01M 10/052 |

OTHER PUBLICATIONS

Espacenet machine translation of (JP2007294111A) (Year: 2007).*
The Rolled-Ribbon Advantage, Rolled-Ribbon Battery Company, Nov. 1, 2016.
The New Standard for High-Power High-Capacity Li-ion Batteries, Rolled-Ribbon Battery Company, 2019.
Rolled-Ribbon Li-ion LFP Cells, Rolled-Ribbon Battery Company, 2019.
Supplementary European Search Report and European Search Opinion, European Patent Application No. EP22808270.7, Dated Jul. 11, 2025.

* cited by examiner

ELECTROCHEMICAL DEVICE HAVING SPIRAL WOUND ELECTRODES

FIELD OF THE INVENTION

The present invention relates to an electrochemical device having spiral wound electrodes, and particularly to, an electrochemical device in a housing with a spiral wound roll of positive and negative electrodes in which applied pressure upon the roll promotes contact of electrodes against surfaces within the housing electrically coupled to terminals of the device. This reduces electrical and thermal resistance between electrodes and terminals, thereby improving electrochemical device operation. The electrochemical device of the present invention is useful in providing batteries, capacitors, or hybrid battery-capacitors.

BACKGROUND OF THE INVENTION

In recent decades, there has been a dramatic increase in the demand for electrochemical devices, especially high-power high-capacity Lithium-ion devices. Lithium-ion electrochemical devices are comprised of electrochemical components encased in hermetically sealed containers that include terminals to provide for electrical connections to the devices. The principal electrochemical components are (anode and cathode) electrodes, separators and electrolytes. Typically, electrodes are metal foils coated with electrochemical formulations. Electrode pairs are formed by layering anode electrodes over cathode electrodes with separator materials between adjacent electrodes. Electrode pairs are layered in electrochemical devices by winding or stacking them, depending on the structure of the electrochemical device. The electrodes and separators are saturated with electrolyte, then assembled into their containers and sealed. In general, for any given electrochemical formulation, the electrochemical device capacity is determined by the electrochemical formulation and the surface area of the electrode pairs. Increasing and decreasing the surface area increases or decreases device capacity, respectively.

Electrochemical devices are referred to herein generally as cells, and typically have been constructed by winding electrode pairs into a cylinder-shaped or oblong-shaped roll that is assembled into cylindrical or oblong containers, respectively. The electrical current and heat generated from the electrochemical reactions traverse long electrodes to exit the cell via tabs welded to the electrodes and the cell terminals. Such long electrode paths increase electrical and thermal resistances that decrease power deliver, decrease energy conversion efficiency, increase heat generation, and can create harmful thermal gradients (hotspots). To increase cell capacity, the electrode surface area is expanded by increasing the length of the electrode layers, which exacerbates these problems by further increasing electrode paths to cell terminals.

To overcome these drawbacks, electrochemical devices were developed as described in U.S. Pat. Nos. 7,195,840, 8,021,775, and 8,263,248 having disc shaped housings containing a spiral wound roll of electrode strips supported upon a Z or zig zag shaped separator layer. Such housings each have end walls providing two separate terminals, between which is sandwiched the wound roll, such that the edge of each of the electrodes along the wound roll is disposed to contact a different one of the end wall terminals. The electrochemical devices of these patents do not utilize welded tabs, and electrical current and heat traverse short distances to device terminals which reduces electrical and thermal resistances, greatly benefiting device performance.

SUMMARY OF THE INVENTION

The present invention utilizes the spiral wound electrode rolls of electrochemical devices described in U.S. Pat. Nos. 7,195,840, 8,021,775, and 8,263,248, which are herein incorporated by reference, in order to promote contact with electrodes along the roll within the housing, thereby improving device performance by reducing electrical and thermal resistance.

Accordingly, it is a feature of the present invention to provide an electrochemical device having a housing with a spiral wound roll of positive and negative electrodes in which applied pressure upon the roll promotes each of the positive and negative electrodes along the roll to contact against a different one of two surfaces within the housing that are each electrically coupled to a different one of two terminals of the device.

Another feature of the present invention is to provide an electrochemical device having a disc shaped housing composed of two non-electrically connected metallic housing portions which are non-adjustably fixable with respect to each other to set the height of the device while pressure is mechanically applied, such as by springs, along the spiral wound roll in the housing.

Briefly described, the present invention embodies an electrochemical device having a roll with a pair of elongated electrodes each supported in one of two alternating folds of a separator layer, and spirally wound in the roll with the separator layer about a central axis to define two opposing ends each only exposing a different one of the wound electrodes along the roll. The electrochemical device has a first member with a first planar surface disposed along a first of the opposing ends of the roll to face a first different one of the exposed electrodes, a second member with a second planar surface disposed along a second of the opposing ends of the roll to face a second different one of the exposed electrodes, and a third member fixable in position with respect to the first member with at least the roll and the second member therebetween. Spring elements are disposed along with the second member between the roll and the third member for applying pressure to force the second member toward the first member in a direction generally parallel to the central axis to promote contact of the first and second planar surfaces with the first and second different one of the exposed electrodes, respectively. The first and third members may be parts of, such as the top and bottom walls, of a housing enclosing at least the roll, the second member, and the spring elements.

In the preferred embodiment, the electrochemical device has an elongated positive electrode strip, an elongated negative electrode strip, and a separator layer spirally wound in a roll around a central axis in which the separator layer is disposed to prevent direct contact between the positive and negative electrode strips. The positive and negative electrode strips each have opposing first and second edges along their length in the roll. The device has a housing with top and bottom walls, in which the top wall provides a first planar surface perpendicular to the central axis. A plate member within the housing provides a second planar surface, perpendicular to the central axis, in which the second planar surface faces the first planar surface with the roll therebetween. The separator layer is of a Z or zig zag shape to provide a first fold portion supporting the positive electrode strip and the second edge thereof, and the second fold portion supporting the negative electrode strip and the second edge thereof. Along the roll, a portion of each of the positive and negative electrode strips exits from the first and second fold portions, respectively, beyond the separator layer in one of two opposite directions generally parallel with the central axis to dispose the first edge of the positive electrode strip and the first edge of the negative electrode strip to each face a different one of the top wall and the plate member. A plurality of spring elements are disposed with the plate member between the roll and the bottom wall, where spring elements extend from the plate member to the bottom wall. The spring elements are compressible with respect to the bottom wall to enable the plate member to apply pressure upon the roll toward the first planar surface in order to position the first edge of each of the positive and negative electrode strips in contact against their respective facing ones of the first and second planar surfaces.

The housing is preferably disc shaped having a first (or upper) housing portion with a generally cylindrical side wall extending from the top wall downward to a lower edge, and a second (or lower) housing portion with a generally cylindrical side wall extending upward from the bottom wall. The first and second housing portions being disposed such that the lower edge of the first housing portion faces the bottom wall of the second housing portion, and the side wall of the second housing portion at least partially overlaps the side wall of the first housing portion to define a gap therebetween. Non-electrically conductive sealing material is disposed between the lower edge of the first housing portion and the bottom wall of the second housing portion, and along the gap, to hermetically seal the roll within the housing. Prior to the housing being closed, the roll is saturated with electrolyte material to enable device operation.

The electrochemical device is set to a selected height along a vertical dimension of the housing, extending from the bottom wall to the top wall, by the first and second housing portions being adjusted in position which respect to each other. Once set at the selected height, the first and second housing portions are non-adjustably fixed to each other by the side walls of the first and second housing portions being crimped together about a circumference of the housing, such as along at least a portion of the gap between the sides of the first and second housing portions with the sealing material disposed therebetween. In addition to promoting contact of electrodes with the first and second planar surfaces in the electrochemical device, the compression of the spring elements accommodates any manufacturing variances in height of the wound roll when the device height is fixed.

In the preferred embodiment, the plurality of spring elements are prongs extending from the plate member bent to provide a spring force when compressed against the bottom wall. The plate member may either be a single circular plate providing the second planar surface in which the prongs are formed from the plate and bent to provide springs, or a pair of abutting circular plates, in which the uppermost plate provides the second planar surface, and the prongs are formed from material of the lowermost plate. The lowermost plate may be of the same body as the single plate configuration of the plate member. The two-plate configuration of the plate member may be useful where the uppermost plate assists in distributing substantially uniform pressure from the lowermost plate. In either configuration, the plate member together with spring elements apply pressure upon the roll. The material forming the prongs may be rectangular, triangular, or other shape, and preferably bent or curved at or near their ends to provide a foot shaped to avoid a sharp edge against the bottom wall. The plurality of spring elements are spaced from each other, preferably in a pattern, that enables the plate member to apply pressure which is substantially uniform toward the first planar surface. While prongs are preferred, other means may be utilized for applying pressure between a plate member providing the second planar surface and the bottom wall of the housing to provide the desired force upon the roll.

The first and second housing portions, plate member, and spring elements are of the same or different electrically conductive materials, such as aluminum, nickel, stainless steel, or other metal material which minimizes electrical and thermal resistance during operation of the device. The first and second housing portions are electrically isolated from each other with the assistance of the sealing material disposed therebetween. In one case, the roll may be oriented in the housing so that the first housing portion provides a cathode terminal of the device by being electrically coupled to the positive electrode strip along the first edge thereof, and the second housing portion provides an anode terminal of the device by being electrically coupled to the negative electrode strip along the first edge thereof via at least the plate member and the spring elements. In another case, the roll may be oriented in the housing so that the first housing portion provides an anode terminal of the device by being electrically coupled to the negative electrode strip along the first edge thereof, and the second housing portion provides a cathode terminal of the device by being electrically coupled to the positive electrode strip along the first edge thereof via at least the plate member and the spring elements.

The positive and negative electrode strips, and the separator layer are spirally wound in the roll with tension about a hub disposed along the central axis in the housing such that the positive and negative electrode strips are each movable at least axially parallel to the central axis responsive to applied pressure by the plate member. Thus, the windings of the positive and negative electrode strips disposed in the roll can each telescope while maintaining contact with the separator layer. It has been found that this assists in enabling the electrode strips along the spiral wound roll to be moved to a position so that their first edges contact against the first and second planar surfaces, respectively, thereby reducing any variation in distance along the roll the first edge of each of the positive and negative electrode strips extends from their respective facing different ones of the first and second planar surfaces that would have been present without such applied pressure from the spring elements. In this manner, a contacting relationship of the positive and negative electrode strips is promoted along their respective first edge against their respective first and second planar surfaces to reduce electrical and thermal resistance between such surfaces and device terminals electrically coupled thereto, thereby improving performance of the device. Furthermore, such contacting relationship is maintained by the applied force of the spring elements despite expansion and contraction of components in the housing due to operational temperatures changes.

Optionally, conductive material is disposed between the plate member and the bottom wall of the housing. Conductive material for example may be metal foam, spun metal fibers, or the like, with apertures or voids extending there through to accommodate spring elements, e.g., prongs that extend to contact the bottom wall. The conductive material can deform as needed with compression of spring elements. Such conductive material may be useful in reducing electrical and thermal resistance by providing additional electrical and thermal connectivity to the spring elements between the plate member and the bottom wall.

The present invention also provides a method comprising steps of: winding a positive electrode strip, a negative electrode strip, and a separator layer in a spiral roll around a central axis in which the positive electrode strip and the negative electrode strip each have a length with a first edge and a second edge extending along the length in the roll, and the separator layer is disposed to prevent direct contact between the positive electrode strip and the negative electrode strip by being of a Z or zig zag shape with a first fold portion supporting the positive electrode strip and the second edge thereof, and the second fold portion supporting the negative electrode strip and the second edge thereof, in which along the roll a portion of each of the positive electrode and the negative electrode strip exits from the first fold portion and the second fold portions, respectively, beyond the separator layer in one of two opposite directions generally parallel with the central axis; providing a first member having a first planar surface perpendicular to the central axis; providing a second member having a second planar surface perpendicular to the central axis and facing the first planar surface with the roll therebetween such that each of the positive electrode and the negative electrode strip exits from the first fold portion and the second fold portions, respectively, beyond the separator layer in one of the two opposite directions generally parallel with the central to face a different one of the first member and the second member; providing a third member fixable in position with respect to the first member; and applying pressure utilizing a plurality of spring elements disposed along with the second member between the roll and the third member to force the second member toward the first member in a direction generally parallel to the central axis in order to position the first edge of the positive electrode strip and the first edge of the negative electrode strip in contact against their respective facing ones of the first planar surface and the second planar surface.

The electrochemical device of the present invention represents a single electrochemical cell. To increase voltage (and capacity) as a battery or capacitor, multiple ones of the housings of the device may be stacked in a fixture, such that the top wall of each housing contacts the bottom wall of a next adjacent successive housing to properly align terminals. The housings of the uppermost and lowermost stacked devices provide different ones of anode and cathode terminals for the multi-cell stack.

BRIEF DESCRIPTION OF THE DRAWINGS

The foregoing and other features and advantages of the invention will become more apparent from a reading of the following description in connection with the accompanying drawings in which.

DETAILED DESCRIPTION OF THE INVENTION

Referring to FIGS. 1-6, the spiral wound roll of electrodes as set forth in incorporated by reference U.S. Pat. Nos. 7,195,840, 8,021,775, and 8,263,248 is described briefly below. Utilization of such wound roll in electrochemical device 28 of the present invention will be described thereafter in connection with FIGS. 8-10, 11A, and 11B.

Figure 1:
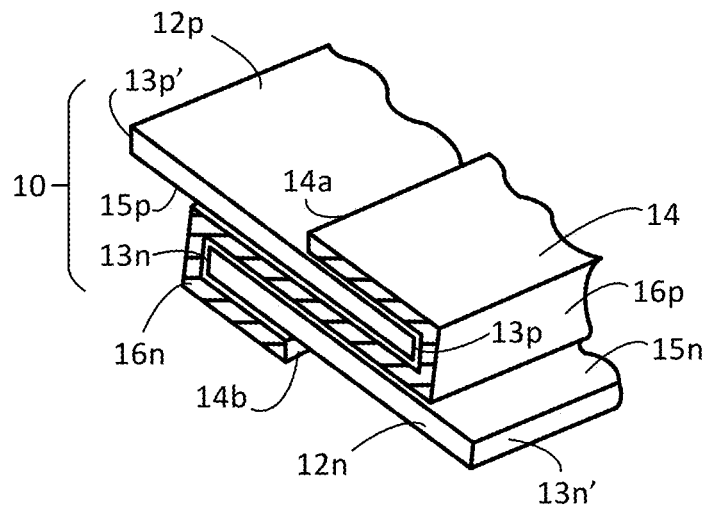
FIGS. 1 and 2 are cut-away perspective views of a portion of the wound roll of positive and negative electrodes of the electrochemical device of the present invention, in which a separator layer is disposed between the positive and negative electrodes in windings of a composite assembly, where one composite assembly is depicted in FIG. 1, and two adjacent layers or windings of the composite assembly are shown in FIG. 2.

The enlarged cut-away perspective view of FIG. 1 illustrates a composite assembly 10 having alternatively, arranged generally parallel, a positive electrode (cathode) strip 12p and a negative electrode (anode) strip 12n, and a separator or separation layer 14 interposed therebetween. Separator layer 14 is of an ionic conductive material. Positive and negative electrode strips 12p and 12n are of both ionic and electronic conductive materials. The materials of these components 12n, 12p, and 14 depend on the type of electrochemical device desired. Composite assembly 10 is referred to as a cell preassembly in the above incorporated by reference patents.

Electrode strips 12p and 12n, for example, are generally metal foil substrates, such as 10-25 microns thick, coated with a thin uniform layer of particles or particulates, such as 25 to 100 microns thick along each of the foil sides, of active electrode material. The negative electrode strip 12n may be of an aluminum foil substrate with lithiated metal oxide particles, and the positive electrode strip 12p of a copper foil substrate carbon and/or graphite particles, but other materials can be used. The particles when coated adhere as porous layers along each of the sides of the foil substrate by a binder material, such as of PVDF, which will later be infiltrated with an electrolyte. Separator layer 14, for example, is a microporous polymer film, such as of polyethylene/polypropylene, or polyethylene oxide with lithium bis-trifluoromethanesulfate amide. The separator layer 14 may be for example 25 microns thick. The materials for the electrode strips 12n and 12p and separator layer 14 are flexible or pliable to enable them to be wound as elongated forms or ribbons.

Figure 2:
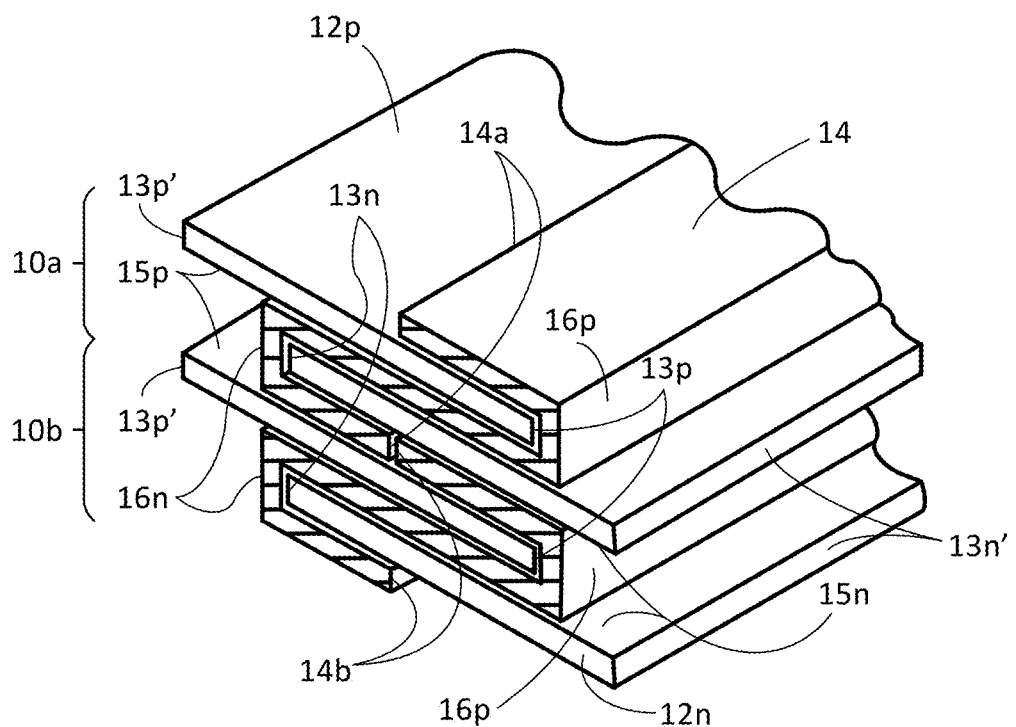

Each electrode strip 12p and 12n has two opposing edges 13p and 13n, respectively, extending along the entire length of the strip. The separator layer 14 is of a Z or zig-zag shape with alternating fold portions (or folds) 16p and 16n. Fold portions 16p and 16n each having an interior width which is slightly less than the width of strips 12p and 12n between their respective edges 13p and 13n. Fold portion 16p supports positive electrode strip 12p and one of its edges 13p, such that a portion 15p of the electrode strip 12p exits therefrom beyond the separator layer 14 to the other of its edges 13p. Fold portion 16n supports negative electrode strip 12n and one of its edges 13n, such that a portion 15n of the electrode exits therefrom beyond the separator layer to the other of its edges 13n. When being wounded to form a roll 22 (FIGS. 3 and 6), successive winding layers of composite assembly 10 of FIG. 1 overlap each other as shown in the enlarged cut-away perspective view of FIG. 2. In FIG. 2, two of the winding layers 10a and 10b are depicted, where edges 14a and 14b of separator layer 14 of successive winding layers align to face either. Portions 15p and 15n of respective electrode strips 12p and 12n extend 0.1 mm to 1.0 mm beyond edge of their respective fold portions 16p and 16n along separator layer 14, and preferably 0.5 mm. The distance which the electrode strips each extend beyond the separator layer 14 can depend upon electrode strip thickness, separator layer thickness and the physical requirement of the overall thickness of the roll 22. Accordingly, the figures showing electrode strips 12p and 12n, and separator layer 14 are illustrative and may not depict them to scale or relative in size to each other. While electrode strips 12n and 12p each interface with separator layer 14 along folds 16n and 16p, they are shown slightly spaced from the separator layer in FIGS. 1 and 2 for purposes of illustration.

Figure 3:
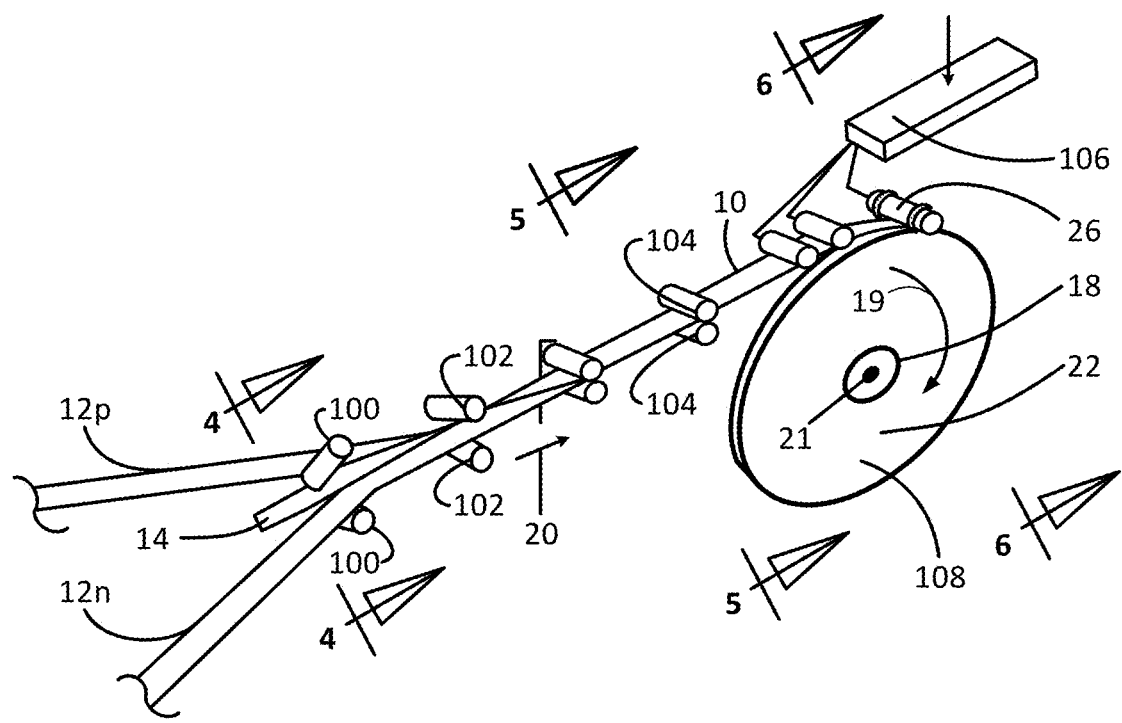
FIG. 3 depicts the process of assembling the wound roll of the electrochemical device of the present invention.
Figure 4:
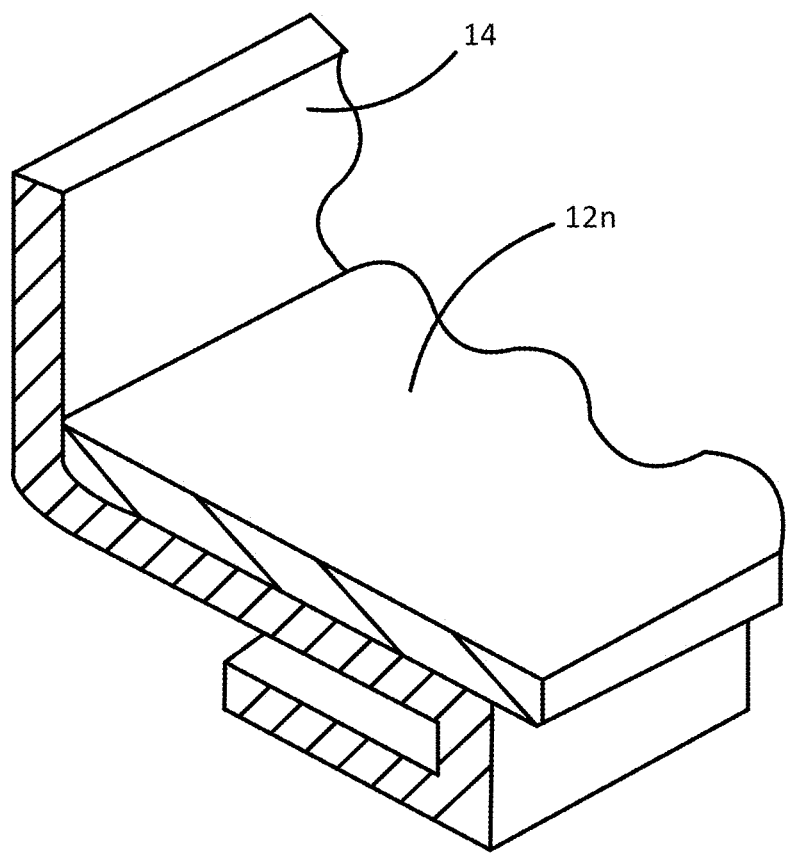
FIG. 4 is a cross-sectional view taken along line 4-4 of FIG. 3 in the direction of arrows as the ends of the line.
Figure 5:
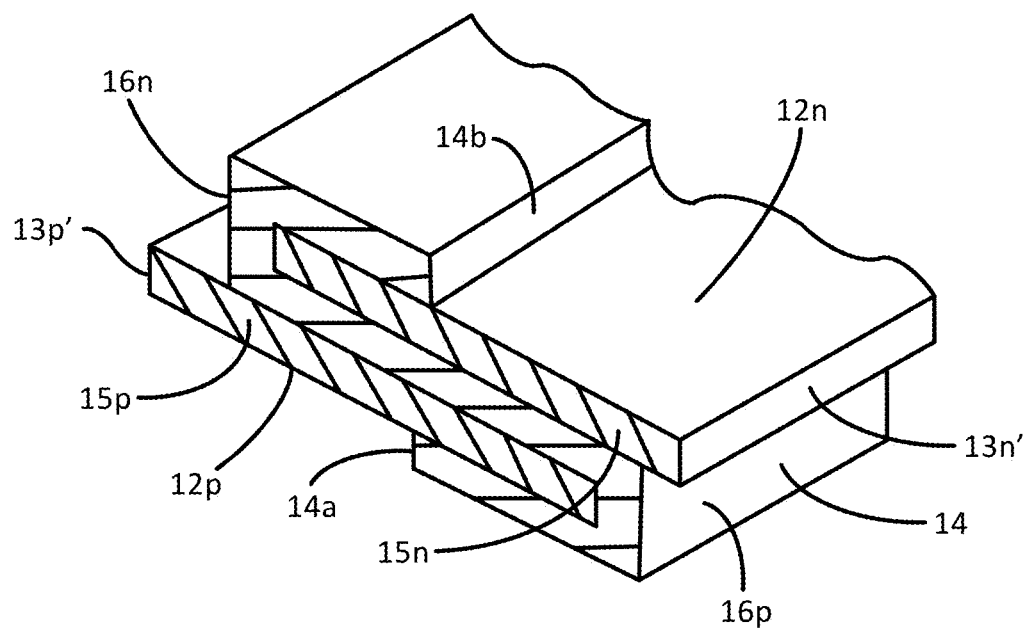
FIG. 5 is a cross-sectional view taken along line 5-5 of FIG. 3 in the direction of arrows as the ends of the line.
Figure 7:
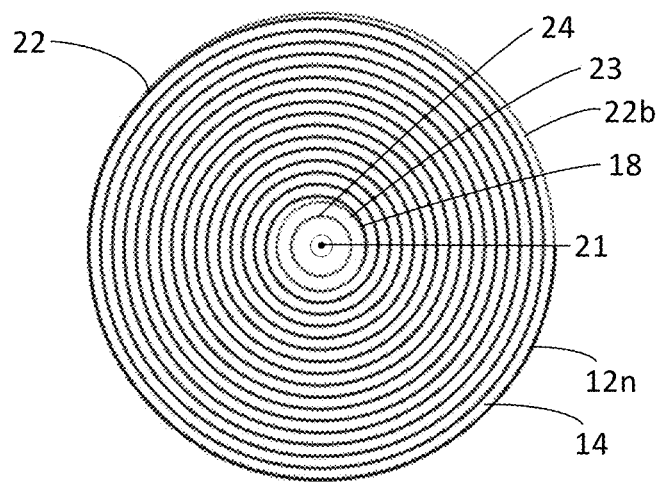
FIG. 7 is top view of an assembled wound roll about a central hub resulting from the process of FIG. 3.

Forming of the composite assembly 10 of FIG. 1 can be performed as depicted in FIG. 3 by folding a strip of separator layer 14 into the shape of a Z to form alternating fold portions 16p and 16n, and sliding the electrode strips 12p and 12n into such their respective fold portions 16p and 16n. Once formed, the composite assembly 10 is wound by a mandrel (not shown) on a center core 18 to form a spiral wound roll 22. As such, the composite assembly 10 is coiled upon itself about core 18 with rotation along a direction of arrow 19 to produce successive winding layers until a roll diameter and/or number of windings is reached for the desired application. A completed roll 22 is shown in FIG. 7. The fabrication apparatus contains three reels of ribbons to supply the materials for positive electrode strip 12p, negative electrode strip 12n, and separator layer 14. As can be seen from FIGS. 4 and 5, the electrode strips 12p and 12n are folded into the separator layer 14 in successive steps 100, 102, 104 and 106 as they travel along a path in a direction of arrow 20 prior to being wound about core 18. Portions 15p and 15n of the electrodes 12p and 12n, respectively, when assembled extend a distance beyond the edge of the separator layer 14 by the interior width of each fold portions 16p and 16n being less than the width of their respective electrode strips 12p and 12n.

Figure 6:
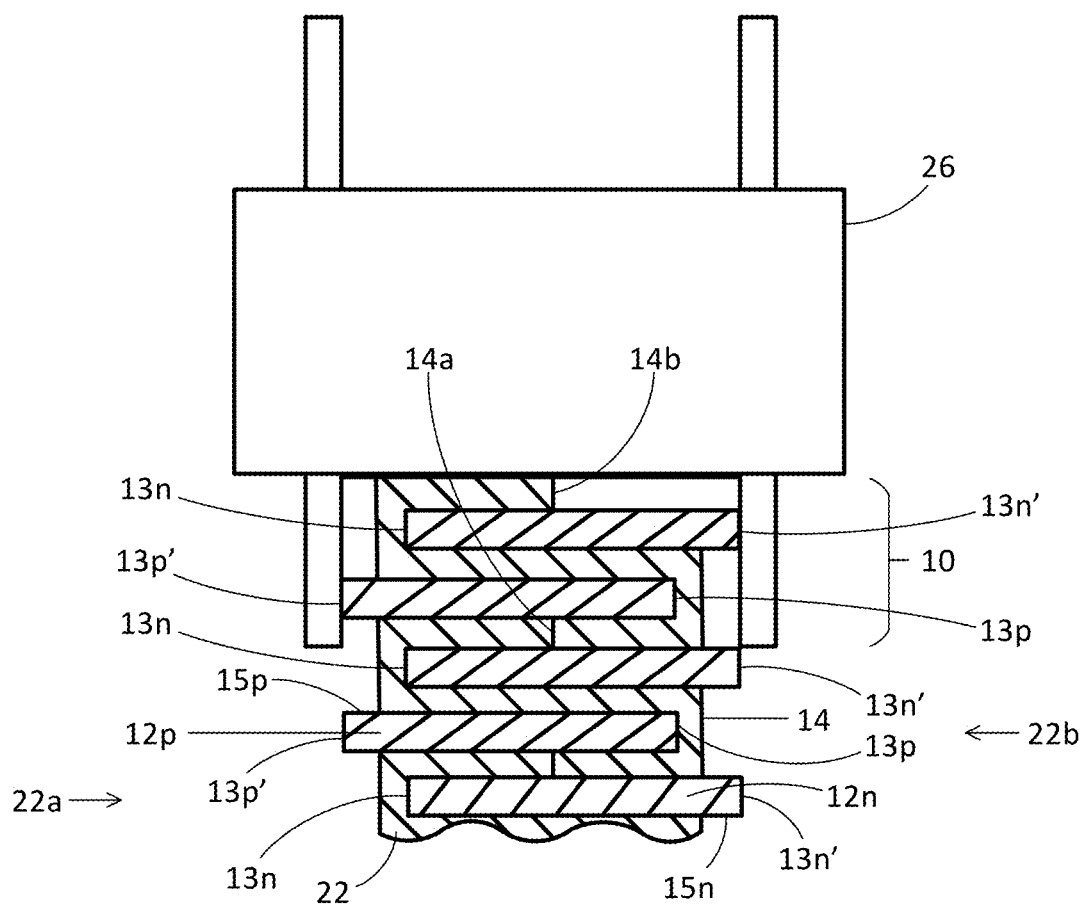
FIG. 6 is a cross-sectional view taken along line 6-6 of FIG. 3 in the direction of arrows as the ends of the line.

After step 104, the formed composite assembly 10 is wound into a disc shape in step 108 on underlying layers of itself as depicted in FIG. 6 aligned along a guide 26. A liquid dispenser (and/or stylus) or an adhesive tape (not shown, but positioned between stages depicted by cross-sections of FIGS. 5 and 6) can apply glue to the edge 14b of the separator layer 14 to adhesively join with edge 14a of the separator layer 14 of the next successive winding layer at step 106 in order to seal separator layer 14 as a continuous coil cell membrane preventing direct contact of wound electrode strips 12p and 12n. By sealing the separator layer 14 with the underlying wound adjacent separator layer 14, as shown for example in FIG. 2, such effectively completes fold portions 16p and 16n of the wound layers of composite assembly 10 as the roll is wound so that positive electrode supporting fold portion 16p opens to expose the positive electrode portion 15p only along one end 22a of roll 22, and negative electrode strip supporting fold portion 16n opens to expose negative electrode portion 15n only along end 22b of roll 22, where ends 22a and 22b oppose each other along different sides of the roll as shown in FIG. 6. This results in portions 15p and 15n generally extending in opposite directions from each other from alternating fold portions 16p and 16n along a dimension parallel to a central axis 21 that extends through core 18 of roll 22. Such edges 13p and 13n being at the terminus of exposed portions 15p and 15n, respectively, of electrode strips 12p and 12n, respectively, are referred to herein and denoted in FIGS. 1, 2, 5, 6, and 9 as exposed edges 13p' and 13n' of roll 22 along roll ends 22a and 22b, respectively.

In addition to guide 26 of FIGS. 3 and 6 having a pair of wheels mounted upon a rotating cylinder for aligning exposed edges 13p' and 13n' of respective electrode strips 12p and 12n of composite assembly 10 when wound in forming roll 22, guide 26 can also serve to debur electrode strips 12p and 12n along exposed edges 13p' and 13n' so that electrode coating is removed therefrom to the substrate foil layer of electrode strips 12p and 12n, respectively. The coiled roll 22 can further be compressed slightly radially and axially, between rollers or the like (not shown), to establish and/or assure firm contact between components within the composite assembly 10 and between adjacent windings of the composite assembly 10.

The height of roll 22, along a dimension parallel to the central axis 21, from exposed edge 13p' of portion 15p of electrode strip 12p to exposed edge 13n' of portion 15n of electrode strip 12n can vary, such as +/−100 microns to 200 microns, from central core 18 to outer edge of the roll 22, even with use of guide 26. This variation is due to factors such as manufacturing tolerances in width of ribbons supplying materials for positive electrode strip 12p, negative electrode strip 12n, and separator layer 14, and manufacturing tolerates in placement of electrode strips 12p and 12n in the fold portions 16p and 16n of separator layer 14. Such variation may be acceptable in some applications; however, it has been found the height non-uniformity negatively effects contact of exposed edges 13p' and 13n' along the entire length of the electrode strips 12p and 12n, respectively, upon those surfaces directly facing exposed edges 13p' and 13n' within a housing which are electrically coupled to device terminals. This can result in varying sized gaps between those surfaces with exposed edges 13p' and 13n' along the length of the spirally wound electrodes which can undesirably increase electrical and thermal resistance during device 28 operation. To address this, the composite assembly 10 windings are tensioned during the fabrication process of roll 22 to maintain separator layer 14 interface with electrode strips 12p and 12n while allowing the positive and negative electrode strips along their spiral winding along the roll 22 to each be movable at least generally axially parallel to central axis 21. The electrode strip 12n and 12p as a result somewhat telescope along their spiral windings which will facilitate in their repositioning to reduce roll height variation responsive to being pressed against planar surfaces 42a and 42b facing roll ends 22a and 22b, respectively, within housing 29 of electrochemical device 28, as described later below.

Wound roll 22 is generally physically confined at completion by a non-conductive outer ring or wrap, or bonding of the end of final wrap composite assembly 10 to the underlying winding to keep its coil spiral under rolled compression and from unwinding, while enabling the axial movement of electrodes provided by strips 12p and 12n along the roll. A right-side view of a completed wound roll 22 of electrode strips 12p and 12n and separate layer 14 is shown in FIG. 7, and is referred to as a rolled-ribbon electrode roll or cell. Central core 18 of wound roll 22 is provided by a cylindrical hub 23, such as of molded plastic, having a circular opening 24 extending therethrough aligned along central axis 21 along which strips 12p and 12n are generally aligned parallel when wound about such hub 23.

Figure 8:
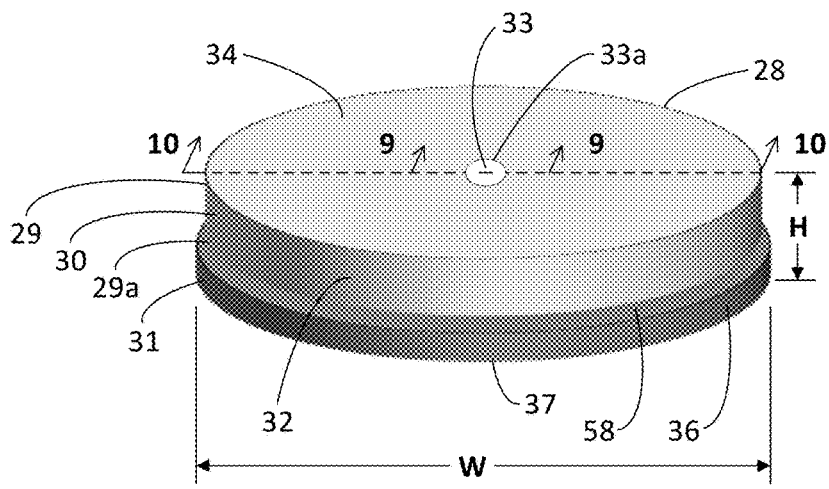
FIG. 8 is a perspective view of the electrochemical device of the present invention in which the height of the housing of the device is fixed by upper and lower housing portions being crimped together.
Figure 9:
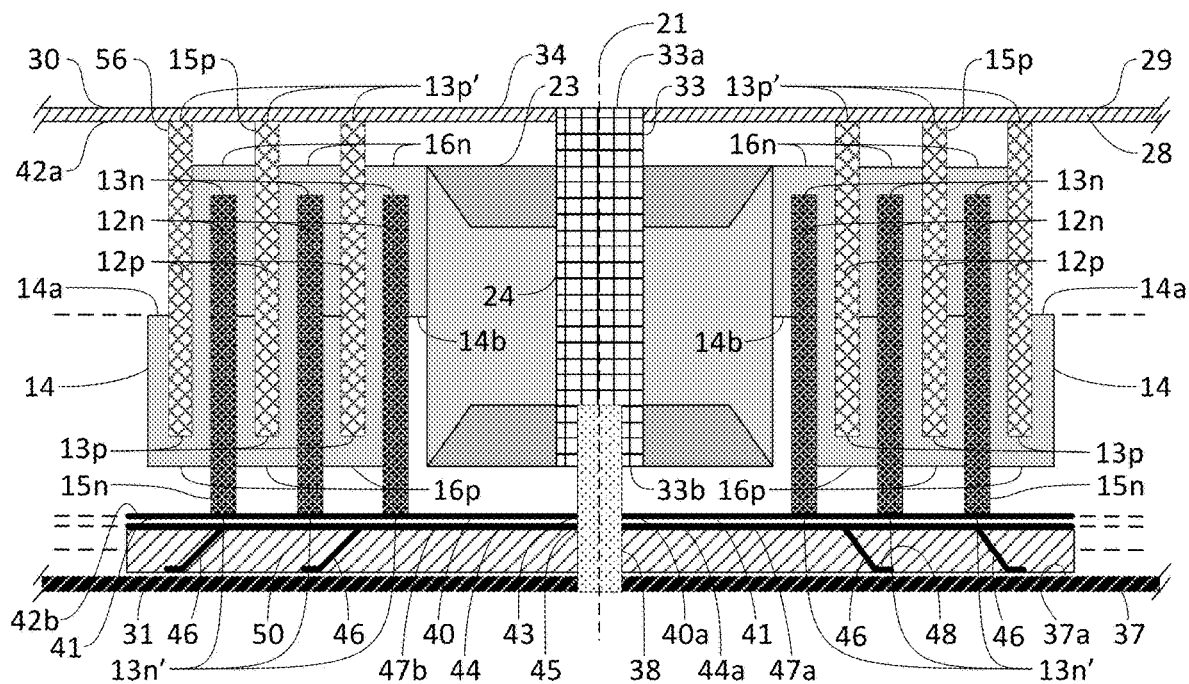
FIG. 9 is a partial cross-sectional view of the electrochemical device along line 9-9 of FIG. 8 in the direction of arrows as the ends of the line.
Figure 10:
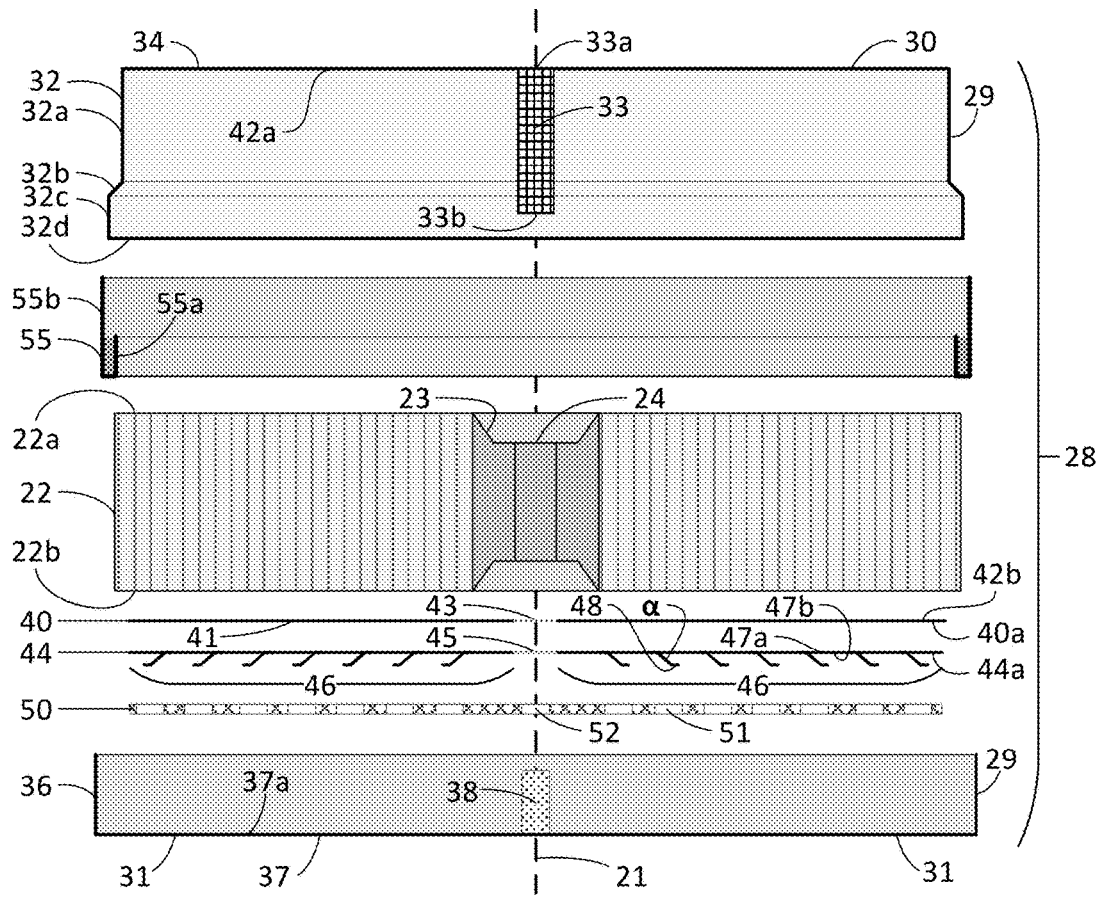
FIG. 10 is an exploded cross-sectional view of the electrochemical device along line 10-10 of FIG. 8 in the direction of arrows as the ends of the line, prior to the height of the housing being fixed.
Figure 11A:
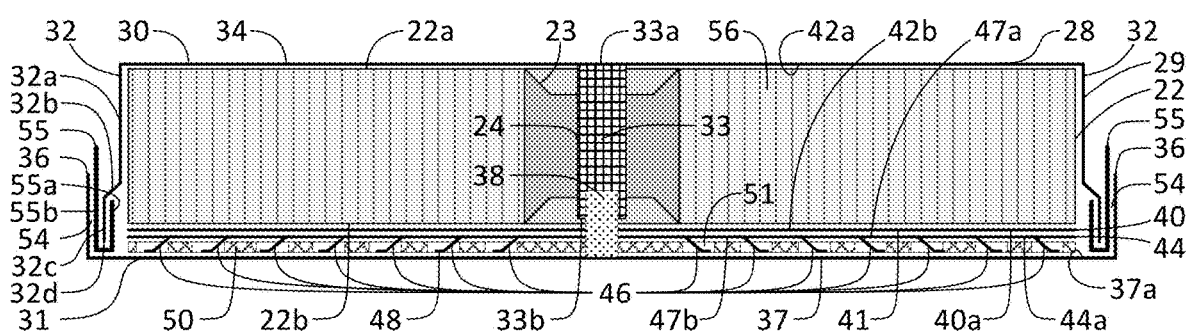
FIG. 11A is cross-sectional view of the electrochemical device along line 10-10 of FIG. 8 shown prior to the device being crimped closed.
Figure 11B:
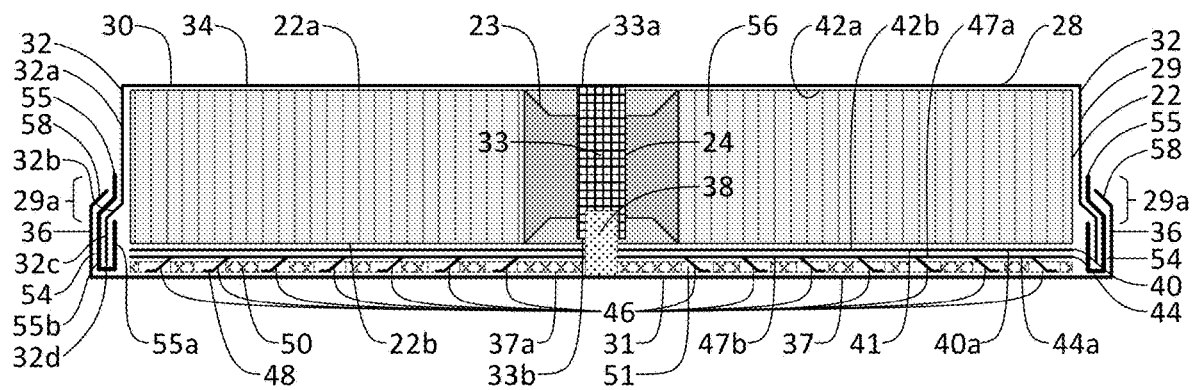
FIG. 11B is another cross-sectional view of the electrochemical device along lines 10-10 of FIG. 8 shown after the device is crimped closed.

Referring to FIGS. 8, 9, 10, 11A and 11B, the electrochemical device 28 of the present invention is shown having a disc shaped housing 29 with an upper housing portion 30 and a lower housing portion 31. Device 28 components are shown as an exploded view in FIG. 10 and assembled in FIG. 11A. FIG. 11B is the same as FIG. 11A after a crimp seal 29a is made to non-adjustably fix the position of the upper and lower housing portions 30 and 31 relative to each other at a desired housing 29 height. The roll 22 in completed device 28 is shown in the partial cross-section of FIG. 9 with electrode strips 12p and 12n. For purposes of illustration, FIGS. 10, 11A, and 11B show roll 22 as a block with vertical lines without its exposed edges 13p' and 13n' contacting planar surfaces 42a and 42b as depicted in FIG. 9.

Figure 14:
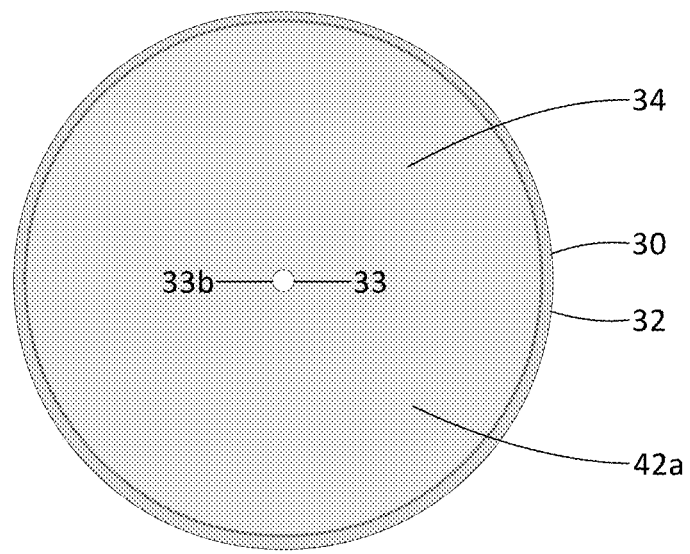
FIG. 14 is a top view looking at the bottom of upper housing portion which is shown removed from the housing of electrochemical device of FIGS. 9, 10, 11A and 11B.

Upper housing portion 30 is pan shaped having a cylindrical side wall 32 extending from a circular top end wall 34. The top wall 34 has an interior flat surface which defines planar surface 42a. A downwardly extending member 33 is disposed centrally along top wall 34 and extends from a closed upper end 33a to an open end 33b. Member 33 is a hollow plastic tube, such as of polyethylene, of a cylindrical or oval cross-sectional shape sized to extend into opening 24 of hub 23 as shown in FIGS. 9, 11A, and 11B. FIG. 14 illustrates upper portion 30 when removed from housing 29. Closed upper end 33a of member 33 is overmolded along an aperture through top wall 34 to avoid any gap between upper end 33a and top wall 34. A pressure relief mechanism (not shown), such as valve(s), may be disposed in member 33, which enables release of gas through vent(s) normally closed along end 33a in order to prevent undesirable excessive gas build-up in housing 29 when sealed closed.

Side wall 32 has regions 32a, 32b, 32c, and a bottom edge 32d. The upper region 32a downwardly extends from top wall 34, where upper region 32a and top wall 34 have a diameter slightly larger than the diameter of roll 22. The side wall 32 is contoured between upper region 32a to its bottom edge 32d to provide an intermediate region 32b which angles or slopes outward to a lower region 32c of a larger diameter than upper region 32a. When roll 22 is received in upper housing portion 30 with member 33 received into opening 24 of roll hub 23, planar surface 42a faces roll end 22a and lies generally perpendicular to central axis 21 of the roll. For example, hub 23 may be at or approximately 25.4 mm in diameter, and roll 22 may be at or approximately 150 mm in diameter.

Figure 15:
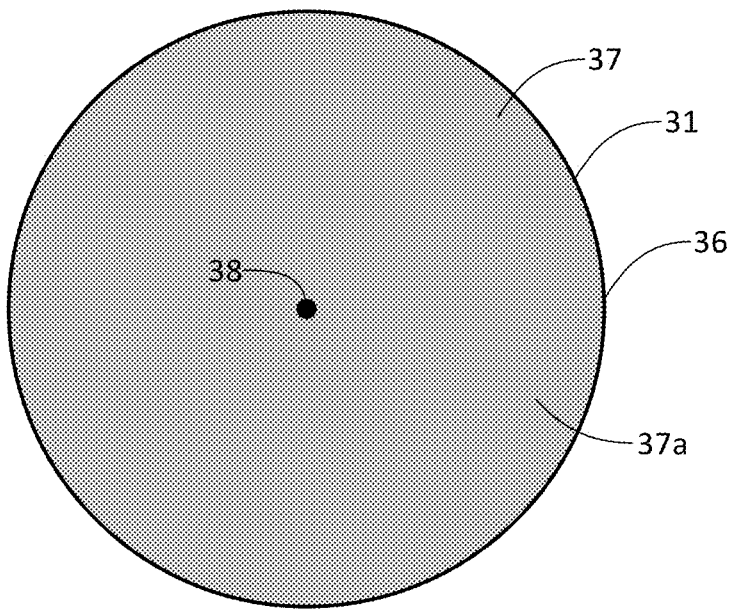
FIG. 15 is a top view looking down at the lower housing portion which is shown removed from the housing of electrochemical device of FIGS. 9, 10, 11A and 11B.

The lower housing portion 31 is pan shaped having a cylindrical side wall 36 extending from a circular bottom end wall 37, and a cylindrical post or stud 38, preferably of metal, is welded to bottom wall 37. FIG. 15 illustrates lower housing portion 31 removed from housing 29. Post 38 extends from the center of bottom wall 37 and is receivable into the lower open end 33b of member 33 of upper housing portion 30. Upper and lower housing portions 30 and 31 are sized such that when housing 29 is assembled side wall 32 of the upper housing portion 30 can extend along the interior of side wall 36 of lower housing portion 31 to define a gap 54 therebetween where they overlap each other. Sealing material 55 is provided along this gap 54 prior to closure of housing 29. For example, the width (W) of housing 29 as shown in FIG. 8 is defined by the outer diameter of bottom wall 37, which may be 165 mm.

A ring of sealing material 55 having a cross-sectional J shape captures the bottom edge 32d of side wall 32 so that the sides of the J shape provide two upwardly extending legs 55a and 55b of different length, where shorter leg 55a extends along an interior surface of lower region 32c of side wall 32, and the longer leg 55b extends along gap 54. Preferably, leg 55b extends from gap 54 slightly above the top edge of side wall 36 of lower housing portion 31. For example, sealing material 55 may be of molded high-density polyethylene or other material that provides an insulating barrier electrically isolating upper and lower housing portions 30 and 31.

Figure 16:
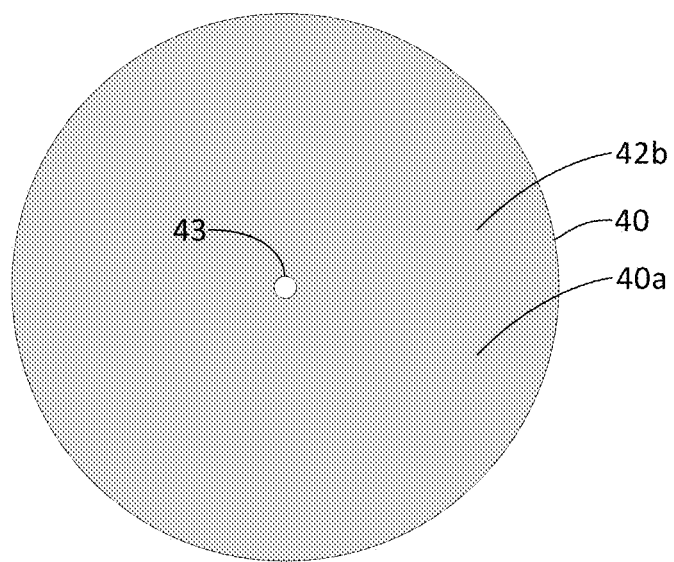
FIG. 16 is top view of another circular plate, shown removed from the housing of electrochemical device of FIGS. 9, 10, 11A and 11B, in which such another circular plate assists the circular plate providing spring elements in distributing pressure across the face of the roll in the housing.

In addition to roll 22, the other components in housing 29 of device 28 include plates 40 and 44, a plurality of spring elements (or springs) 46, and an optional conductive material 50. Plate 40 is disposed along roll 22 such that its flat upper surface provides planar surface 42b, generally perpendicular to central axis 21, and exposed edge 13n' of portion 15n of negative electrode 12n faces planar surface 42b. Plate 40 by being generally perpendicular to central axis 21 is also generally perpendicular to portions 15p and 15n of positive electrode 12p and negative electrode 12n, respectively, that extend generally parallel to central axis 21 along their lengths, as shown for example in FIG. 9. In one embodiment, plate 40 has a circular disc body 40a of rigid metal material with a flat lower surface 41 and a flat upper surface providing planar surface 42b. Plate 40 has a central hole 43 extending there through of a diameter slightly larger than post 38. FIG. 16 shows plate 40 removed from housing 29. The lower surface 41 of plate 40 abuts an upper surface 47a of plate 44. Plate 44 has a circular disc body 44a of rigid metal material with a central hole 45 extending there through also of a diameter slightly larger than post 38. For purposes of illustration, plates 40 and 44 are not shown abutted in FIGS. 9, 11A and 11B, and abutted in the broken view of FIG. 11C partially showing these plates. The diameter of bodies 40a and 44a are at least the same as the diameter of roll 22.

Figure 12:
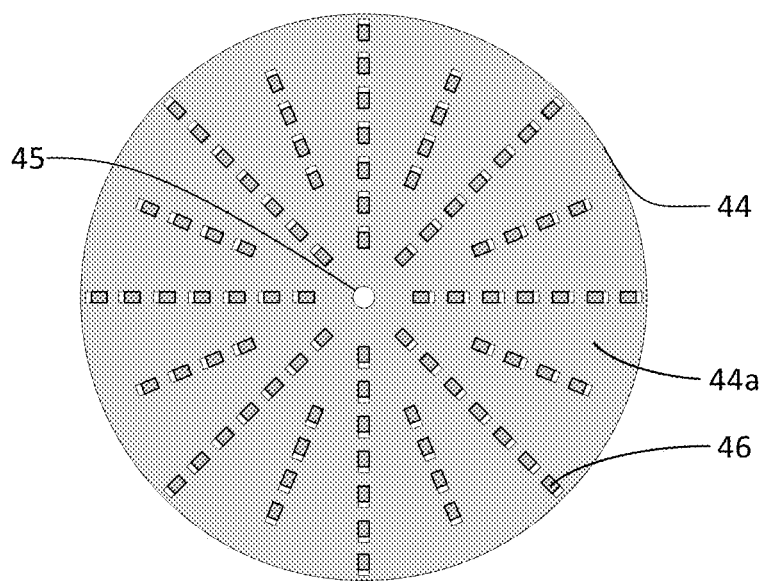
FIG. 12 is a bottom view of the circular plate providing spring elements extending therefrom in which the plate is shown removed from the housing of electrochemical device of FIGS. 9, 10, 11A and 11B.

Spring elements 46 downwardly extends from the underside of plate 44 to the flat interior surface 37a of bottom wall 37 when plate 44 is received in lower housing portion 31 and aligned by post 38 extending through hole 45 of plate 44. Spring elements 46 are prongs cut and/or stamped from plate 44. Such prongs are each bent at a first angle α (FIG. 10) with respect to the flat upper surface 47a and lower surface 47b of plate 44, and then bent to provide a foot 48 that lays parallel to and against the interior surface 37a of bottom wall 37 to avoid a sharp edge against bottom surface 37a that may otherwise damage that surface. The angle α shown for spring elements 46 is illustrative, and may be different than as depicted. For example, angle α may be at or between 15 to 30 degrees, but is preferably 20 degrees. Spring elements 46 are spaced from each other in a pattern, such as shown in FIG. 12, so that they evenly distribute force to provide substantially uniform pressure along the area of plate 40 and thus upon roll 22 via plate 44, i.e., across the face of the roll having exposed edge 13n' of negative electrode 12n facing planar surface 42b as depicted in FIG. 9. Other patterns and number of spring elements 46 may be used than shown in FIG. 12. For example, spring elements 46 may number 100, or other number, depending of the desire total force to be applied across roll 22, as described later in connection with FIG. 17.

Plate 40 is provided to assist in distributing pressure from the spring elements 46 upon roll 22, via plate 44, so that substantially uniform pressure is applied to roll 22. However, distribution of pressure may be sufficiently uniform without plate 40, and in that case, plate 40 may be removed from device 28, such that upper surface 47a of plate 44 instead provides planar surface 42b. Accordingly, a plate member is provided in housing 29 represented by either a single plate 44, or pair of abutting plates or plate members 40 and 44, which together with spring elements 46 provide pressure upon end 22b of roll 22.

Figure 13:
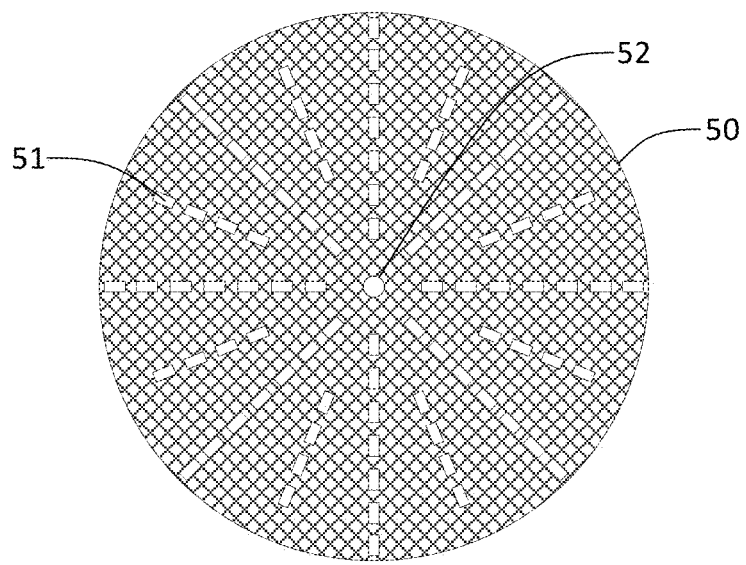
FIG. 13 is a top view of optional conductive material shown removed from the housing of electrochemical device of FIGS. 9, 10, 11A and 11B.

Conductive material 50 is optionally disposed between plate 44 and the bottom wall 37 of the lower housing portion 31, and contacts both lower surface 47b of plate 44 and bottom surface 37a of bottom wall 37. Conductive material 50 may be useful to reduce electrical and thermal resistance that may be present across plate 44 to bottom wall 37. Conductive material 50 for example may be metal foam, spun metal fibers, or the like. As best shown in FIGS. 11A, 11B, and 13, apertures or voids 51 extend through conductive material 50 to accommodate spring elements 46 that extend therethrough to the bottom wall 37. A central hole 52 is provided through conductive material 50 of a diameter slightly larger than post 38. Conductive material 50 can deform as needed with variation in distance between the plate 44 and bottom wall 37 by movement of upper and lower housing portions 30 and 31 relative to each other when setting the height of housing 29 against the compression of spring elements 46.

The exterior surface of upper housing portion 30, along side wall 32 and top wall 34, will provide the cathode terminal of electrochemical device 28 by being electrically coupled with planar surface 42a and positive electrode 12p along roll end 22a, and the exterior surface of lower housing portion 31, along side wall 36 and bottom wall 37, will provide the anode terminal of device 28 by being electrically coupled with planar surface 42b and negative electrode 12n along roll end 22b via conductive materials of plate 44, plate 40 if present, spring elements 46, and conductive material 50 if present. To enable operation of the device 29 as a battery or capacitor, an electrolyte 56, as described earlier and in the incorporated by reference patents, is provided in housing 29 to saturate roll 22 infiltrating about electrode strips 12n and 12p and pores in the separator layer 14. Components electrical coupled with the positive electrode strip 12p are of metal materials or composites that reduce electrical and thermal resistance with the positive electrode strip 12n, such as aluminum, nickel or stainless steel, or other material, in accordance with materials of electrode strip 12p and the electrolyte that provides desired device 28 operational performance. Components electrically coupled with the negative electrode strip 12n, i.e., plate 44, plate 40 if present, post 38, spring elements 46, conductive material 50 if present, and lower housing portion 31, are of metal materials or composites that reduce electrical and thermal resistance with the negative electrode strip 12n, such as copper plated stainless steel, or nickel, or other material, in accordance with materials used for electrode strip 12n and the electrolyte that provides desired device 28 operational performance. Such may be same or similar to those material used in connection with the housing for the roll of electrodes described in the earlier incorporated by reference patents. Housing portions 30 and 31 may each be formed by being stamped from metal sheet of desired material, and then member 33 and post 38, respectively, attached thereto. Plates 40 and 44 may also each be formed by being stamped from a metal sheet.

In assembling electrochemical device 28, the upper housing portion 30 is disposed to open upwards, and roll 22 is gently dropped therein so that cylindrical member 33 extends into opening 24 of hub 23 and planar surface 42a provided by top wall 34 faces exposed edges 13p' of positive electrode strip 12p along roll end 22a. The exposed edges 13p' yet not being compressed against planar surface 42a, other than by gravity, may not fully contact planar surface 42a along the entire length the positive electrodes strip's spiral form in the roll 22. The J-shaped sealing material 55 is located along edge 32d of upper housing portion 30 such that legs 55a and 55b extend along the interior and exterior surfaces, respectively, of lower region 32c of side wall 32. Electrolyte 56 is added to upper housing portion in order to saturate roll 22. The plate 44 with spring members 46, and then plate 40 are positioned along lower housing portion 31 with spring members 46 extending toward bottom wall 37, so that post 38 extends through hole 45 of plate 44, and hole 43 of plate 40. Once the electrolyte is absorbed by the electrodes and separator layers of roll 22, the lower housing portion 31 with plates 40 and 44 is then placed over upper housing portion 30 such that planar surface 42b provided by the upper surface of plate 40 faces exposed edge 13n' of negative electrode strip 12n along roll end 22b, the interior surface of side wall 36 of the lower housing portion 31 extends along leg 55b of sealing material 55 which fills gap 54, upper end of post 38 extends into open end 33b of cylindrical member 33 of upper housing portion 30, and edge 32d of upper housing portion 30 faces bottom wall 37 of the lower housing portion 31 with sealing material 55 therebetween, as shown in FIG. 11A. If plate 40 is optionally not included in device 28, the assembly is the same, except that planar surface 42b is instead provided by the upper surface 47a of plate 44 facing exposed edge 13n' of negative electrode strip 12n along roll end 22b. If conductive material 50 is provided, it is first placed upon interior surface 37a of lower housing portion 31 so that post 38 extends through opening 52, and then plate 44 is disposed thereupon in the same manner as described above, but where spring members 46 extend through voids 51 of conductive material 50 to interior surface 37a of bottom wall 37.

The height (H) of device 28 (FIG. 8) is defined as the distance between upper and lower exterior surfaces of top and bottom walls 34 and 37, respectively, along a vertical dimension parallel to central axis 21. With housing 29 assembled, planar surfaces 42a and 42b are disposed along opposite ends 22a and 22b, respectively of roll 22, and exposed edges 13p' and 13n' compressed against planar surfaces 42a and 42b across the roll, respectively, in accordance with compression of spring elements 46 as upper and lower housing portions 30 and 31 are moved with respect to each other along the vertical dimension to adjust the device 28 to a selected height. Electrode strips 12p and 12n may be foil substrates as described earlier, and as such, their respective exposed edges 13p' and 13n' can deform slightly where pressed in contact against planar surfaces 42a and 42b, respectively. During height adjustment of housing 29, the upper portion of post 38 may move along member 33, via end 33b, hub 23 of roll 22 may move along member 33, and sealing material 55 can deform as needed while maintaining the housing 29 sealed closed. To non-adjustable fix housing 29 at the selected device height, at least a portion 58 of side wall 36 of lower housing portion 31 is crimped to bend at an angle by pressure externally applied to housing 29, such as by circular clamp (not shown), to deform lower housing 31 against intermediate region 32b of side wall 32 of upper housing portion 30 in order to form crimp seal 29a (FIGS. 8 and 11B) along a circumference of housing 29 that retains upper and lower housing portion 30 and 31 non-adjustably fixed relative to each other. The crimped seal 29a further retains housing 29 hermetically sealed closed.

Figure 11C:
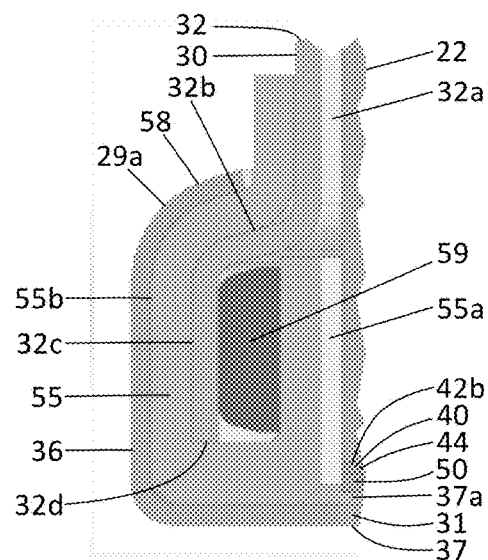
FIG. 11C is an enlarged broken perspective cross-sectional view along the left side of the electrochemical device of FIG. 11B without illustrative spacing between adjacent components as in FIGS. 11A and 11B.

While side walls 32 and 36 abut different sides of sealing material 55, especially where crimped seal 29a is formed, these and other adjacent components of device 28 are schematically shown slightly spaced from each other in FIGS. 11A and 11B for purposes of illustration. FIG. 11C depicts crimped seal 29a in more detail, without such illustrative spacing, where side wall 36 and sealing portion 55 are together bent or deformed against side wall 32. Preferably, the distance between legs 55a and 55b of sealing material 55 is at or about the thickness of side wall 32. This distance may be more than such thickness to additionally accommodate an optional member 59, such as a molded plastic ring, as shown in FIG. 11C, that circumferentially extends between portion 32c of side wall 32 and leg 55a of sealing material 55. This optional member 59 would be included with the sealing material 55 during assembly of device 28, and if present may provide backing support for portion 32c of side wall 32 when crimped seal 29a is formed.

The crimped seal 29a non-adjustable fixes housing 29 at the selected device height as shown in example of device 28 of FIG. 8. In this example, the height of the device 28 may be at or approximately 30.3 mm, but other height as desired for the particular application and components of the device. Further in this example, roll 22 may have a height of 26.2 mm+/−0.3 mm, plate 44 plus spring elements 46 (when compressed) may have a height of 1.6 mm with a +/−0.3 mm compression range, top and bottom walls 34 and 37 at or about 1 mm thick, wherein plate 40 and plate 44 are each at or about 0.5 mm thick. While housing 29 with upper and lower housing portions 30 and 31 are preferred, other housings than shown in the figures with different shaped side walls 32 and 36 may be used with sealing material 55 of a shape that electrically isolates upper and lower housing portions and allows crimp seal 29a to be formed. Crimp seal 29a may be shaped differently than shown in order to accommodate a differently shaped housing.

In addition to promoting contact of electrodes with the first and second planar surfaces 42a and 42b in the electrochemical device 28, the compression of the spring elements 46 accommodates any manufacturing variances in height of the wound roll 22 when the device height is fixed. The variation in compression of spring elements 46, prior to upper and lower housing portions 30 and 31 being crimped together, is preferably equal, at least approximately, to allowable manufacturing variance of roll 22 height, since different ones of the roll 22 can slightly vary in height from each other when manufactured within such tolerance. In the earlier example of device 28 height, roll 22 of a height of 26.2 mm has a manufacturing height variance of +/−0.3 mm, and height of spring elements 46 between surface 44a of plate 44 to bottom surface 37a (when compressed) of 1.6 mm with +/−0.3 mm depending on amount of compression of spring elements 46 in housing 29 to account for roll 22 manufacturing variance. This may also accommodate other manufacturing variance in height of device 28, if present, such as in the thickness of plate 44, plate 40 if present, and/or walls 34 and 37. This improves efficiency in production of the electrochemical device 28 by allowing manufacturing variance to be accounted for during assembly of the device 28 that could otherwise vary electrical performance of different ones of devices 28 using the same type or model of wound roll 22.

Figure 17:
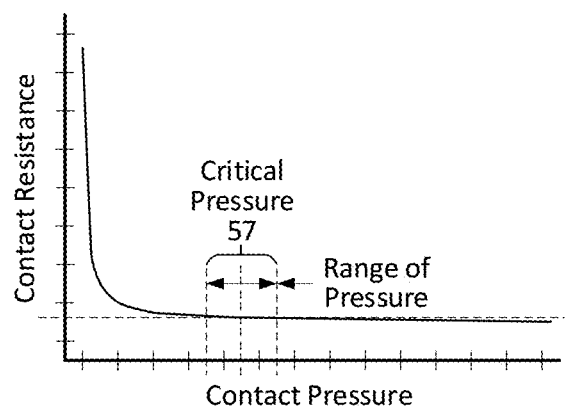
FIG. 17 is a graph of contact resistance versus contact pressure showing the general curve of preferred critical range of the pressure of an electrode against a surface to minimize contact resistance along the wound roll in the housing of the electrochemical device of present invention.

Also, the force provided by spring elements 46 is selected such that the contact pressure between electrode strips 12p and 12n against respective planar surfaces 42a and 42b minimizes electrical contact resistance during operation of device 28. The general relationship of such contact pressure and electrical resistance of electrodes is shown in the graph of FIG. 17 of contact pressure versus electrical resistance. As pressure increases, the resistance will rapidly decrease until a critical pressure range 57 is reached when the curve flattens and become asymptomatic, where large increases is pressure have diminishing impact on decreasing resistance. Thus, within the height compression range variation of spring elements 46, e.g., +/−0.3 mm of the earlier example of device 29 height, acceptable pressure force is applied across the roll 22 via plate 44 (or combination of two plates 40 and 44) preferably in such critical pressure range 57. The number of spring elements 46 is selected to sum of desired pressure along critical range 57 upon ends 22a and 22b of roll 22 when pressured in contact with planar surfaces 42a and 42b, respectively. The particular critical range 57 for device 28 depends on the materials used in forming the roll 22, and for example, may be 1.4 kg/cm$^2$+/−15%. In such example, in the case of one hundred spring elements 46 for a 165 mm diameter roll 22, spring elements are shaped to provide 2.4 kg of force per spring element when compressed, for a total approximately 240 kg over the entire plate 44. Such minimization of electrical contact resistance of electrodes also reduces thermal contact resistance.

With the electrode strips 12*p* and 12*n* being assembled so that they can move as needed at least axially along the central axis 21, exposed edges 13*p*' and 13*n*' of electrode strips 12*p* and 12*n* along the entire spiral wound roll 22 move to a position in contact against the first and second planar surfaces 42*a* and 42*b*, respectively, that extend along roll ends 22*a* and 22*b*, respectively, in response to applied pressure of spring elements 46 as shown in FIG. 9, thereby reducing variation in distance along the roll the exposed edges 13*p*' and 13*n*' that would have been present from planar surfaces 42*a* and 42*b* without such applied pressure, and hence maximizing exposed edges 13*p*' and 13*n*' contact with planar surfaces 42*a* and 42*b* that are electrically coupled to device 29 terminals. In this manner, a contacting relationship of the positive and negative electrode strips 12*p* and 12*n* is promoted along their respective edges 13*p* and 13*n* against their respective planar surfaces 42*a* and 42*b* to reduce electrical and thermal resistance between such surfaces and device terminals electrically coupled thereto, thereby improving performance of device 28.

Figure 18:
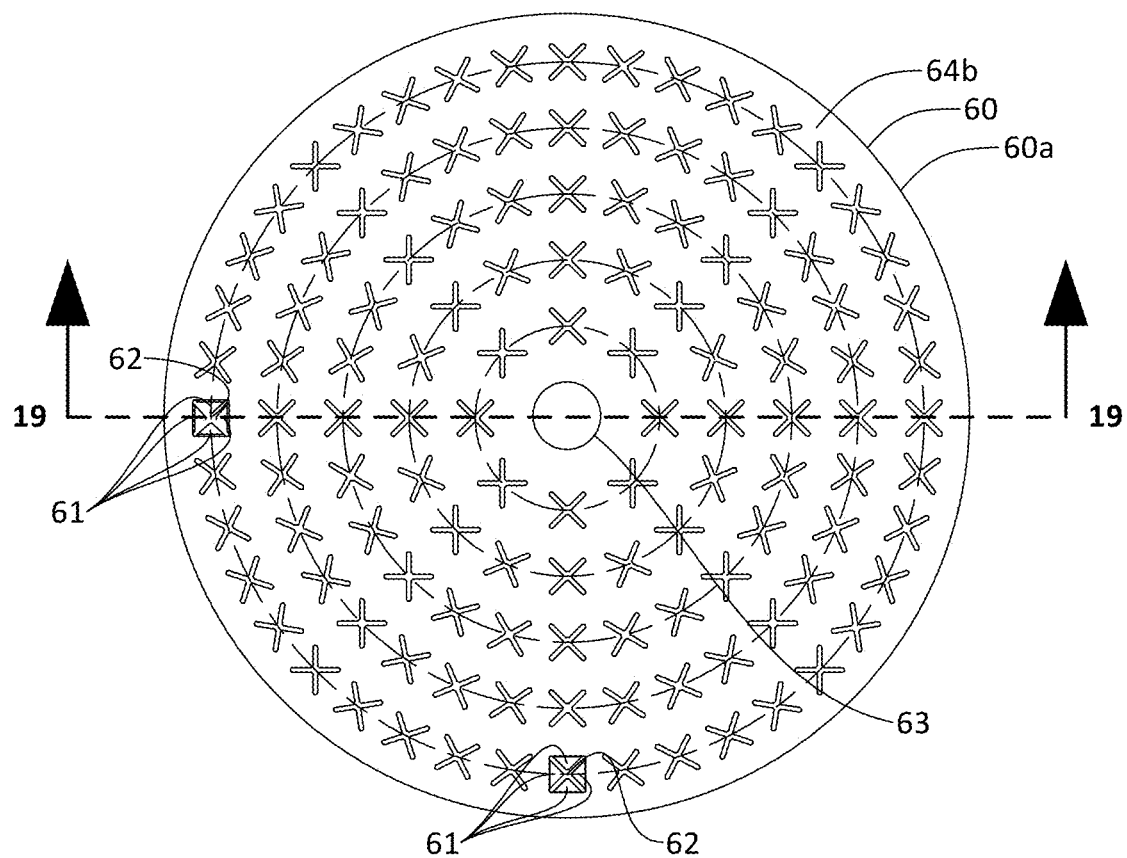
FIG. 18 is a bottom view of an alternative circular plate with different shaped spring elements extending therefrom in which the plate is shown removed from the housing of electrochemical device of FIGS. 9, 10, 11A and 11B.
Figure 19:
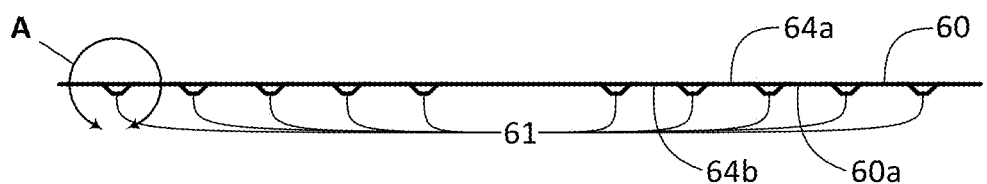
FIG. 19 is a cross-sectional view of the plate of FIG. 18 taken along line 19-19 in the direction of arrows as the ends of the line.

Other spring elements of different shapes may be used than as shown in FIGS. 9, 10, 11A, 11B, and 12. For example, FIGS. 18 and 19 show a plate 60 having a rigid body 60*a* of the same dimensions and material as plate 44, but with spring elements 61 provided by triangular shaped prongs which are in groups of four prongs, where each group of four prongs downwardly extends from a cross cut 62 stamped along body 60*a* to form the prongs. The prongs of spring elements 61 are uniformly distributed in these groups, which are spaced from each other along five concentric circles of different diameter about a center hole 63. Other pattern of spring elements 61 may be used so long as substantially uniform pressure is applied upon roll 20 when plate 60 replaces plate 44 in housing 29. Center hole 63 is provided for orientation of plate 60 on post 38 of housing 29 in the same manner as plate 44. For purposes of illustration, only two of cross cuts 62 are bent to provide spring elements 61 in FIG. 18. One of the ten groups of spring elements 61 shown in the cross-section of FIG. 19 is enlarged in FIG. 20, along a circle labelled A in FIG. 19, to illustrate the shape of spring elements 61.

Figure 20:
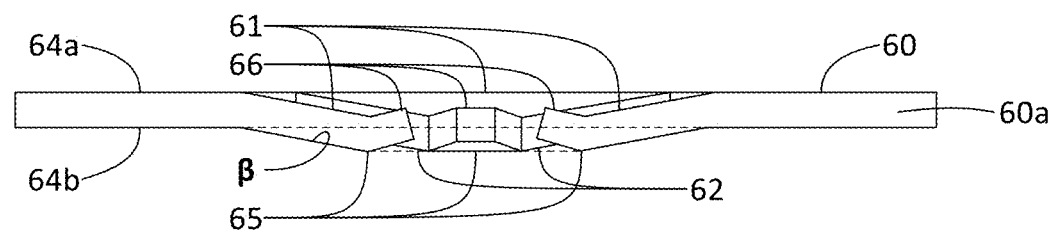
FIG. 20 is a more detailed view of cross-sectional view of FIG. 19 along a circled region A.

In FIG. 20, three of the four spring elements 61 of one cross cut 62 are shown, where each spring element 61 is provided by a prong downwardly bent at an angle β, with respect to its flat upper surface 64*a* and lower surface 64*b*, to a foot 65 that then upwardly bent or curved to its end 66. The bottom of the foot 65, like the foot 48 of each spring element 46, extends to bottom surface 37*a* of housing 29 to avoid sharp edge against bottom surface 37*a* that may otherwise damage that surface. Unlike spring elements 46 which are same in cross-sectional shape along their length, each spring element 61 being triangular, reduces in cross-sectional shape as it extends from the material of plate 60 to foot 65 and then end 66. The angle β shown for spring elements 61 is illustrative, and may be different than as depicted in FIG. 20. For example, angle β may be at or between 15 to 30 degrees, but is preferably 20 degrees. Spring elements 61 and plate 60 operate in the same manner as spring elements 46 and plate 44, respectively, in housing 29 as described earlier. Spring elements 61 may extend in voids 51 of conductive material 50 where such voids are sized and positioned for spring elements 61, if such conductive material 50 is present between plate 60 and bottom wall 37 of housing 29. Other geometric shapes for prongs than rectangular (e.g., shape of spring elements 46) or triangular (e.g., shape of spring elements 61) may extend from plate 44 or 60 to provide desired pressure in housing 29 upon roll 22. While such a plate providing spring elements 46 or 61 are in the form of prongs, preferably having a proximal portion continuous with the material of plate 44 or 60 and a distal portion that provides foot 48 or 65, respectively, other means may be utilized for applying pressure, such as a metal coil spring or springs, or conductive foam or mesh same or similar to conductive material 50 but without voids 51, compressed between plate 40 and bottom wall 37.

While the roll 22 is shown in figures oriented with positive electrode strip 12*p* contacting planar surface 42*a*, and negative electrode strip 12*n* contacting planar surface 42*b*. The roll 22 can be disposed in the opposite orientation in housing 29 by having exposed edge 13*n*' of negative electrode strip 12*n* along roll end 22*b* to face and contact planar surface 42*a*, and the exposed edge 13*p*' of positive electrode strip 12*p* along roll end 22*a* to face and contact planar surface 42*b*. In such reverse orientation, upper and lower housing portion 30 and 31 then providing anode and cathode terminals, respectively, of device 29. Also, internal pressure applied upon roll 20 is maintained by spring elements 46 or 61 to assure contact between electrode strips 12*p* and 12*n* and their respective planar surface 42*a* and 42*b* despite expansion and contraction of the housing or components therein due to operational temperatures changes. While planar surface 42*a* facing roll 22 is provided by top wall 34, less preferably, surface 42*a* may be provided by another plate or other member in housing 29 electrically coupled with top wall 34.

The electrochemical device 28 represents a single electrochemical cell. To increase capacity of device 28, one can accommodate housing 29 to a roll 20 of increased height by increasing the height of upper region 32*a* of side wall 32 of upper housing portion 30 accordingly without need to change other components in housing 29. Also, to increase voltage or capacity, as a battery or capacitor, multiple ones of housings 29 of the device 28 may be stacked in a fixture (not shown), such that the top wall 34 of each of the housings contacts the bottom wall 37 of a next adjacent successive housing to properly align terminals. The uppermost and lowermost stacked devices 29 provide different ones of anode and cathode terminals for the multi-cell stack.

From the foregoing description, it will be apparent that there has been provided improved electrochemical devices having spiral wound electrodes. Variations and modifications in the herein described electrochemical devices will undoubtedly suggest themselves to those skilled in the art. Accordingly, the foregoing description should be taken as illustrative and not in a limiting sense.

The invention claimed is:

1. An electrochemical device comprising:
 a positive electrode strip, a negative electrode strip, and a separator layer spirally wound in a roll around a central axis in which said separator layer is disposed to prevent direct contact between said positive electrode strip and said negative electrode strip, wherein said positive electrode strip and said negative electrode strip each have a length with a first edge and a second edge opposing the first edge along said length in said roll;
 a housing having a top wall and a bottom wall;
 said top wall having a first planar surface perpendicular to said central axis;
 a first plate member and a second plate member within said housing, said first plate member having a second planar surface perpendicular to said central axis, said second planar surface facing said first planar surface with said roll disposed therebetween, and said first plate member being disposed between said roll and said second plate member;

said separator layer being of a zig zag shape to provide a first fold portion supporting said positive electrode strip and the second edge thereof and a second fold portion supporting said negative electrode strip and the second edge thereof, in which, along said roll, a portion of each of said positive electrode strip and said negative electrode strip exits from said first fold portion and said second fold portion, respectively, beyond said separator layer in one of two opposite directions generally parallel with said central axis to dispose said first edge of said positive electrode strip and said first edge of negative electrode strip to each face a different one of said first planar surface and said second planar surface, wherein the first edge which faces said second planar surface represents a face of said roll; and said second plate member provides a plurality of spring elements each being a prong cut from material of said second plate member and extending from said second plate, bent at an angle with respect to said second plate member, to form a foot disposed against said bottom wall, said spring elements being compressible with respect to said bottom wall to enable said second plate member, via said first plate member, to apply substantially uniform pressure across said face of said roll toward said first planar surface in order to position said first edge of said positive electrode strip and said first edge of said negative electrode strip in contact against their respective facing of said different ones of said first planar surface and said second planar surface to provide one or more of reduced electrical and thermal resistance.

2. The electrochemical device according to claim 1 wherein said positive electrode strip, said negative electrode strip, and said separator layer are each in a spiral winding in said roll with tension so that said positive electrode strip and said negative electrode strip are movable, at least axially parallel to said central axis, to enable the spiral winding of said positive electrode strip and the spiral winding of said negative electrode strip to each telescope to facilitate any repositioning of said positive electrode strip and said negative electrode strip responsive to said pressure when applied.

3. The electrochemical device according to claim 1 wherein said pressure, when applied, reduces any variation in distance along said roll so that said first edge of said positive electrode strip and said first edge of said negative electrode strip extends from their respective facing of said different ones of said first planar surface and said second planar surface.

4. The electrochemical device according to claim 1 wherein said spring elements are spaced from each other in a pattern along said second plate member that enables said spring members to apply said pressure as an evenly distributed force across said face of said roll via said first plate member.

5. The electrochemical device according to claim 1 wherein at least a portion of said foot extends parallel to and against said bottom wall.

6. The electrochemical device according to claim 1 wherein said prong has an end that upwardly bends or curves away from said bottom wall after a portion of said foot contacts said bottom wall.

7. The electrochemical device according to claim 1 wherein said spring elements are provided by triangular-shaped prongs which are in groups of four prongs forming a crisscross cut in the material of said second plate member and each of said prong is bent at said angle to said foot.

8. The electrochemical device according to claim 1 further comprising deformable or compressible conductive material disposed about said spring elements between said second plate member and said bottom wall with apertures or voids to accommodate said spring elements.

9. The electrochemical device according to claim 1 wherein said housing further comprises a first housing portion with a generally cylindrical side wall extending from said top wall downward to a lower edge, and a second housing portion with a generally cylindrical side wall extending upward from said bottom wall, and said first and second housing portions being disposed such that said lower edge faces said bottom wall and said side wall of said second housing portion at least partially overlaps said side wall of said first housing portion to define a gap therebetween, and said electrochemical device further comprises non-conductive sealing material disposed between said lower edge of said first housing portion and said bottom wall, and along said gap to seal said housing closed.

10. The electrochemical device according to claim 9 wherein said first and second housing portions, said first and second plate members, and said spring elements are of same or different electrically conductive materials, said first and second housing portions are electrically isolated from each other, and said first housing portion provides a cathode terminal of said device by being electrically coupled to said positive electrode strip along the first edge thereof, and said second housing portion provides an anode terminal of said device by being electrically coupled to said negative electrode strip along the first edge thereof via at least said first and second plate members and said spring elements.

11. The electrochemical device according to claim 9 wherein said first and second housing portions, said first and second plate members, and said spring elements are of same or different electrically conductive materials, said first and second housing portions are electrically isolated from each other, and said first housing portion provides an anode terminal of said device by being electrically coupled to said negative electrode strip along the first edge thereof, and said second housing portion provides a cathode terminal of said device by being electrically coupled to said positive electrode strip along the first edge thereof via at least said first and second plate members and said spring elements.

12. The electrochemical device according to claim 9 wherein said housing is of a selected height along a vertical dimension extending from said bottom wall to said top wall by said first and second housing portions being movable to a fixed position with respect to each other to provide said selected height.

13. The electrochemical device according to claim 9 wherein said housing is of a height non-adjustably fixed by said side wall of said second housing portion and said side wall of said first housing portion being crimped together by being bent or deformed about a circumference of said housing along at least a portion of said gap with said sealing material disposed therebetween.

14. The electrochemical device according to claim 9 wherein said housing further contains electrolyte material when sealed to enable operation of said electrochemical device.

15. The electrochemical device according to claim 9 wherein a plurality of ones of said housing are stacked in which the top wall of each different said ones of said housing contacts the bottom wall of a next adjacent said ones of said housing.

16. The electrochemical device according to claim 1 wherein said angle is at or between 15 to 30 degrees with respect to said second plate member.

17. The electrochemical device according to claim 1 wherein said angle is 20 degrees with respect to said second plate member.

18. The electrochemical device according to claim 1 wherein said bottom wall has a post or stud extending along said central axis perpendicular to said bottom wall, and said first and second plate members each have a central opening through which said post is received to orient said first and second plate members in said housing.

19. The electrochemical device according to claim 1 wherein said prong comprises a proximal portion continuous with said second plate member and a distal portion that provides said foot.

20. The electrochemical device according to claim 19 wherein said distal portion of said prong is different in cross-sectional shape than said proximal portion of said prong.

21. The electrochemical device according to claim 19 wherein said distal portion and said proximal portion of said prong are same in cross-sectional shape.

22. An apparatus for applying pressure against a roll having a pair of elongated electrodes, each supported in one of two alternating folds of a separator layer, and spirally wound in the roll with said separator layer about a central axis to define two opposing ends, each only exposing a different one of the electrodes wound along the roll, said apparatus comprising:
 a housing having a top wall and a bottom wall;
 said top wall providing a first member having a first planar surface disposed along a first of said two opposing ends of said roll to face a first different one of the exposed electrodes;
 a second member within said housing having a second planar surface disposed along a second of said two opposing ends of said roll to face a second different one of the exposed electrodes, in which said second member is generally perpendicular to said electrodes along their respective length;
 said bottom wall providing a third member non-adjustably fixable in position with respect to said first member with at least said roll and said second member between said first member and said third member; and
 a fourth member within said housing between said second member and said third member, said fourth member providing spring elements, each of said spring elements being a bent prong from material of said fourth member to a foot disposed against said third member, said spring elements being compressible to enable said fourth member to apply pressure to force said second member toward said first member in a direction generally parallel to said central axis promoting contact of said first planar surface and said second planar surface with said first and said second different one of the exposed electrodes, respectively, to provide one or more of reduced electrical and thermal resistance.

23. The apparatus according to claim 22 wherein said electrodes are movable in said wound roll at least axially parallel to said central axis responsive to said applied pressure to promote said contact of said first planar surface and said second planar surface with said first and said second different one of the exposed electrodes, respectively, along said roll.

24. The apparatus according to claim 22 wherein said fourth member is a plate.

25. The apparatus according to claim 24 wherein said second member is a plate.

26. The apparatus according to claim 22 further comprising conductive material about said spring elements compressible under said pressure.

27. The apparatus according to claim 22 wherein said top wall is electrically coupled to one terminal associated with said first different one of the exposed electrodes, and said second member and said fourth member are electrically coupled to another terminal along said bottom wall associated with said second different one of the exposed electrodes.

28. The apparatus according to claim 22 wherein contact of said first planar surface and said second planar surface with said first and said second different one of the exposed electrodes, respectively, is along an edge of said first and said second different one of the exposed electrodes.

29. An electrochemical device comprising:
 a positive electrode strip, a negative electrode strip, and a separator layer spirally wound in a roll around a central axis in which said separator layer is disposed to prevent direct contact between said positive electrode strip and said negative electrode strip, wherein said positive electrode strip and said negative electrode strip each have a length with a first edge and a second edge opposing the first edge along said length in said roll;
 a housing having a top wall and a bottom wall;
 said top wall having a first planar surface perpendicular to said central axis;
 a member within said housing having a second planar surface perpendicular to said central axis and facing said first planar surface;
 said separator layer being of a zig zag shape to provide a first fold portion supporting said positive electrode strip and the second edge thereof and a second fold portion supporting said negative electrode strip and the second edge thereof, in which, along said roll, a portion of each of said positive electrode strip and said negative electrode strip exits from said first fold portion and said second fold portion, respectively, beyond said separator layer in one of two opposite directions generally parallel with said central axis to dispose said first edge of said positive electrode strip and said first edge of negative electrode strip to each face a different one of said top wall and said member, wherein said member is generally perpendicular to said positive electrode strip and said negative electrode strip along their respective said length;
 a plurality of spring elements disposed with said member between said roll and said bottom wall, said spring elements being compressible with respect to said bottom wall to enable said member to apply pressure upon said roll toward said first planar surface in order to position said first edge of said positive electrode strip and said first edge of said negative electrode strip in contact against their respective facing said different one of said first planar surface and said second planar surface;
 said housing further comprises a first housing portion with a generally cylindrical side wall extending from said top wall downward to a lower edge, and a second housing portion with a generally cylindrical side wall extending upward from said bottom wall, and said first and second housing portions being disposed such that said lower edge faces said bottom wall and said side wall of said second housing portion at least partially overlaps said side wall of said first housing portion to define a gap therebetween;

non-conductive sealing material disposed between said lower edge of said first housing portion and said bottom wall, and along said gap to seal said housing closed; and said first and second housing portions being non-adjustably fixed with respect to each other with said spring elements maintaining a contact pressure of said first edge of said positive electrode strip and said first edge of said negative electrode strip against their respective facing of said different ones of said first planar surface and said second planar surface which minimizes electrical contact resistance during operation of said device.

30. The electrochemical device according to claim 29 wherein said first and second housing portions are movable with respect to each other in a vertical dimension along said central axis with compression of said spring elements prior to said first and second housing portions being non-adjustably fixed with respect to each other.

31. The electrochemical device according to claim 29 wherein said first and second housing portions are non-adjustably fixed with respect to each other by said side wall of said second housing portion and said side wall of said first housing portion being crimped together by being bent or deformed about a circumference of said housing along at least a portion of said gap with said sealing material disposed therebetween.

32. The electrochemical device according to claim 29 wherein said positive electrode strip, said negative electrode strip, and said separator layer are each in a spiral winding in said roll with tension so that said positive electrode strip and said negative electrode strip are movable, at least axially parallel to said central axis, to enable the spiral winding of said positive electrode strip and said negative electrode strip to each telescope to facilitate any repositioning of said positive electrode strip and said negative electrode strip responsive to said pressure when applied by said member.

33. The electrochemical device according to claim 29 wherein said member represents a plate, and said plurality of spring elements represent a plurality of bent prongs extending from the plate to said bottom wall, and said plate has two opposing surfaces in which one of said two opposing surfaces provides said second planar surface, and another of said two opposing surfaces faces said bottom wall, in which said plate applies said pressure toward said first planar surface when said spring elements of said plate compress against said bottom wall.

34. The electrochemical device according to claim 29 wherein said member represents two plates, a first of said plates having two opposing surfaces, one of said two opposing surfaces provides said second planar surface and other of said two opposing surfaces abuts said second of said plates, and said spring elements extend from said second plate toward said bottom wall, in which said first plate distributes said pressure substantially uniformly toward said first planar surface when said spring elements compress against said bottom wall.

* * * * *